US008653681B2

(12) United States Patent
Whinnery

(10) Patent No.: US 8,653,681 B2
(45) Date of Patent: Feb. 18, 2014

(54) POWER EQUIPMENT APPARATUS HAVING FLYWHEEL ASSEMBLY

(75) Inventor: Joseph P. W. Whinnery, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 505 days.

(21) Appl. No.: 13/079,321

(22) Filed: Apr. 4, 2011

(65) Prior Publication Data

US 2012/0248773 A1 Oct. 4, 2012

(51) Int. Cl.
*H02P 1/00* (2006.01)
*H02P 9/00* (2006.01)

(52) U.S. Cl.
USPC .......................... 290/40 C; 318/139; 180/165

(58) Field of Classification Search
USPC ............ 290/40 C, 46; 318/139, 158; 180/165
See application file for complete search history.

(56) References Cited

U.S. PATENT DOCUMENTS

| | | | |
|---|---|---|---|
| 1,362,024 | A | 12/1920 | McKee |
| 2,247,749 | A | 7/1941 | deVenel |
| 2,472,944 | A | 6/1949 | Furer et al. |
| 2,829,467 | A | 4/1958 | Pagano |
| 3,124,007 | A | 3/1964 | Swinney |
| 3,232,635 | A | 2/1966 | Dreschel |
| 3,373,832 | A | 3/1968 | Summers |
| 3,511,454 | A | 5/1970 | Hamilton |
| 3,756,338 | A | 9/1973 | Goodridge |
| 3,787,066 | A | 1/1974 | Hautier |
| 3,878,913 | A | 4/1975 | Lionts et al. |
| 3,881,736 | A | 5/1975 | Wilfert |
| 4,200,168 | A | 4/1980 | Moog |
| 4,300,168 | A | 11/1981 | Kawamura |
| 4,531,605 | A | 7/1985 | Scholz et al. |
| 4,545,455 | A | 10/1985 | Kanemura et al. |
| 4,625,985 | A | 12/1986 | Nakano et al. |
| 4,629,947 | A | 12/1986 | Hammerslag et al. |
| 4,691,798 | A | 9/1987 | Engelbach |
| 4,712,806 | A | 12/1987 | Patrin |
| 4,768,607 | A | 9/1988 | Molina |

(Continued)

FOREIGN PATENT DOCUMENTS

| | | | |
|---|---|---|---|
| EP | 1955936 | A1 | 8/2008 |
| EP | 1977964 | A1 | 10/2008 |
| WO | 2007086176 | A1 | 8/2007 |
| WO | 2011/115699 | A1 | 9/2011 |

OTHER PUBLICATIONS

Office Action; Notification Date: Nov. 13, 2012; U.S. Appl. No. 12/984,167; Applicant: Joseph P. W. Whinnery; Filing Date: Jan. 4, 2011; Titled: Flywheel Assemblies and Vehicles Including Same; 10 pages in its entirety.

(Continued)

*Primary Examiner* — Nicholas Ponomarenko
(74) *Attorney, Agent, or Firm* — Ulmer & Berne LLP

(57) ABSTRACT

A power equipment apparatus includes an engine, a starter switch, a battery, a flywheel assembly, a power regulator, and a controller. The engine includes a crankshaft. The starter switch is configured for selective actuation by an operator. The flywheel assembly comprises a rotor and a stator. The power regulator is coupled with each of the battery and the stator. The power regulator is configured to regulate power transfer between the battery and the stator in response to a control signal. The controller is coupled with each of the battery, the starter switch, and the power regulator. The controller is configured to generate the control signal.

23 Claims, 4 Drawing Sheets

(56) References Cited

U.S. PATENT DOCUMENTS

| | | | | |
|---|---|---|---|---|
| 4,779,485 | A | 10/1988 | Dollison et al. | |
| 4,917,209 | A | 4/1990 | Horiike et al. | |
| 5,214,358 | A | 5/1993 | Marshall | |
| 5,568,023 | A | 10/1996 | Grayer et al. | |
| 5,684,244 | A | 11/1997 | Jones | |
| 5,820,439 | A | 10/1998 | Hair, III | |
| 5,823,281 | A | 10/1998 | Yamaguchi et al. | |
| 5,939,848 | A * | 8/1999 | Yano et al. | 318/139 |
| 5,960,900 | A | 10/1999 | Cheng | |
| 6,040,634 | A | 3/2000 | Larguier | |
| 6,042,449 | A | 3/2000 | Ishimoto | |
| 6,098,584 | A | 8/2000 | Ahner et al. | |
| 6,126,185 | A | 10/2000 | Kelley et al. | |
| 6,360,838 | B1 | 3/2002 | Kulhavy | |
| 6,369,532 | B2 * | 4/2002 | Koenen et al. | 318/150 |
| 6,370,475 | B1 | 4/2002 | Breed et al. | |
| 6,382,338 | B1 | 5/2002 | Forbes | |
| 6,476,529 | B1 | 11/2002 | Tilbor | |
| 6,491,121 | B2 | 12/2002 | Morimoto et al. | |
| 6,710,579 | B2 | 3/2004 | Ebel et al. | |
| 6,918,467 | B2 | 7/2005 | Kasten | |
| 7,006,901 | B2 | 2/2006 | Wang | |
| 7,195,487 | B2 | 3/2007 | Robbins | |
| 7,211,905 | B1 | 5/2007 | McDavid, Jr. | |
| 7,296,663 | B2 | 11/2007 | Spina | |
| 7,314,225 | B2 | 1/2008 | Murnen et al. | |
| 7,350,787 | B2 | 4/2008 | Voss | |
| 7,512,466 | B2 | 3/2009 | Hart et al. | |
| 7,643,933 | B2 | 1/2010 | Hirata | |
| 7,825,616 | B2 * | 11/2010 | Clark et al. | 318/139 |
| 2003/0010554 | A1 | 1/2003 | Grong et al. | |
| 2003/0146594 | A1 | 8/2003 | Bunya et al. | |
| 2004/0178009 | A1 | 9/2004 | Pavlykivskyj | |
| 2005/0045398 | A1 | 3/2005 | Suzuki | |
| 2006/0244263 | A1 * | 11/2006 | Manning | 290/1 R |
| 2007/0001423 | A1 | 1/2007 | Murnen et al. | |
| 2007/0163828 | A1 | 7/2007 | Manganaro | |
| 2008/0249684 | A1 | 10/2008 | Hirata et al. | |
| 2009/0200093 | A1 | 8/2009 | Ren | |
| 2009/0254251 | A1 | 10/2009 | Sato | |
| 2011/0231041 | A1 | 9/2011 | Kim et al. | |
| 2011/0231060 | A1 | 9/2011 | Kim et al. | |
| 2011/0231085 | A1 | 9/2011 | Kim et al. | |

OTHER PUBLICATIONS

Document entitled: “CD Dynastore: Overview” ; 28 pages; Compact Dynamics; Apr. 29, 2008.

Brochure entitled: “HT-RSI High Motor Torque Momentum and Reaction Wheels 14-68 Nms with integrated Wheel Drive Electronics”; 2 pages; Rockwell Collins Deutschland GmbH, Germany; retrieved from www.electronicnote.com/RCG/HT-RSI_A4.pdf on Jan. 27, 2011; Copyright 2007.

Article entitled: “Centre for Advanced Electronically Controlled Drives”, 3 pages; Ewan Goodier, University of Leicester, Department of Engineering; retrieved from www.le.ac.uk/engineering/research/groups/power/caecd/6p_pedrg.html on Jul. 31, 2009.

Pending U.S. Patent Application entitled: “Flywheel Assemblies and Vehicles Including Same”; Joseph P. W. Whinnery; U.S. Appl. No. 12/984,167, filed Jan. 4, 2011.

Williams, Maurice L., Final Office Action; Notification Date of Jun. 20, 2013; U.S. Appl. No. 12/984,167; Titled: Flywheel Assemblies and Vehicles Including Same; Filed: Jan. 4, 2011; Inventor: Joseph P. W. Whinnery, in its entirety.

Notice of Allowance and Fee(s) Due with accompanying documents in co-pending U.S. Appl. No. 12/984,167; Inventor: Joseph P.W. Whinnery; Filing Date: Jan. 4, 2011; Titled: Flywheel Assemblies and Vehicles Including Same; Date Mailed: Oct. 2, 2012; in its entirety.

U.S. Appl. No. 61/314,540, entitled Regenerative-Powered Gyroscopic Stabilization Apparatus and Methods filed Mar. 16, 2010; Inventors: Kim et al.; 40 pages.

Office Action; Notification Date: Apr. 6, 2012; U.S. Appl. No. 12/984,167; Applicant: Joseph P. W. Whinnery; Filing Date: Jan. 4, 2011; Titled: Flywheel Assemblies and Vehicles Including Same; 12 pages; in its entirety.

* cited by examiner

POWER EQUIPMENT APPARATUS HAVING FLYWHEEL ASSEMBLY

TECHNICAL FIELD

The present invention relates to a power equipment apparatus having a flywheel apparatus.

BACKGROUND

Some conventional vehicles are equipped with an internal combustion engine having a battery-powered electric start system. In order to facilitate starting of the engine in cold weather conditions, the battery typically comprises a lead-acid type battery which is capable of providing the significant instantaneous power (typically identified in terms of "cold-cranking amps") required to start the engine in cold weather conditions. However, the battery is typically relatively large and heavy, and its presence upon a vehicle can accordingly present engineering challenges, design inefficiencies, and adverse effects upon the vehicle.

SUMMARY

In accordance with one embodiment, a power equipment apparatus comprises an engine, an electric starter motor, a starter switch, a battery, a flywheel assembly, first and second power regulators, and a controller. The engine comprises a crankshaft. The electric starter motor is operatively coupled with the crankshaft. The starter switch is configured for selective actuation by an operator. The flywheel assembly comprises a rotor and a stator. The stator comprises a low voltage coil and a high voltage coil. The first power regulator is coupled with each of the battery and the low voltage coil. The first power regulator is configured to regulate power transfer between the battery and the low voltage coil in response to a first control signal. The second power regulator is coupled with each of the high voltage coil and the electric starter motor. The second power regulator is configured to regulate power transfer between the high voltage coil and the electric starter motor in response to a second control signal. The controller is coupled with each of the battery, the starter switch, the first power regulator, and the second power regulator. The controller is configured to generate the first control signal and the second control signal.

In accordance with another embodiment, a saddle-type vehicle comprises a frame, a seat, an engine, an electric starter motor, a starter switch, a battery, a flywheel assembly, first and second power regulators, and a controller. The seat is attached to the frame and is configured to support an operator. The engine comprises a crankshaft and is attached to the frame. The electric starter motor is operatively coupled with the crankshaft. The starter switch is configured for selective actuation by an operator. The flywheel assembly comprises a rotor and a stator. The stator comprises a low voltage coil and a high voltage coil. The first power regulator is coupled with each of the battery and the low voltage coil. The first power regulator is configured to regulate power transfer between the battery and the low voltage coil in response to a first control signal. The second power regulator is coupled with each of the high voltage coil and the electric starter motor. The second power regulator is configured to regulate power transfer between the high voltage coil and the electric starter motor in response to a second control signal. The controller is coupled with each of the battery, the starter switch, the first power regulator, and the second power regulator. The controller is configured to generate the first control signal and the second control signal. All power transferred between the battery and the electric starter motor passes through the flywheel assembly. The flywheel assembly is configured to selectively receive power from the battery and store the power received from the battery. The flywheel assembly is further configured to selectively dispense the power received from the battery to the electric starter motor to facilitate starting of the engine.

In accordance with yet another embodiment, a power equipment apparatus comprises an engine, a starter switch, a battery, a flywheel assembly, a power regulator, and a controller. The engine comprises a crankshaft. The starter switch is configured for selective actuation by an operator. The flywheel assembly comprises a rotor and a stator. The rotor is rotationally coupled with the crankshaft. The power regulator is coupled with each of the battery and the stator. The power regulator is configured to regulate power transfer between the battery and the stator in response to a control signal. The controller is coupled with each of the battery, the starter switch, and the power regulator. The controller is configured to generate the control signal.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Certain embodiments are hereinafter described in detail in connection with the views and examples of FIGS. 1-5. A power equipment apparatus includes a flywheel assembly, as described in further detail below. A power equipment apparatus can comprise, for example, a vehicle or some other piece of engine-driven power equipment such as, for example, a lawn mower, a leaf blower, a chipper/shredder, a pressure washer, a trimmer, a generator, a portable cement mixer, and a chain saw. Examples of suitable vehicles include, for example, a car, a truck, a van, an aircraft, a watercraft, farm equipment, a tractor, construction equipment, and saddle-type vehicles. Saddle-type vehicles include, for example, motorcycles, scooters, all terrain vehicles (ATVs), snowmobiles, and personal watercraft.

Figure 1:
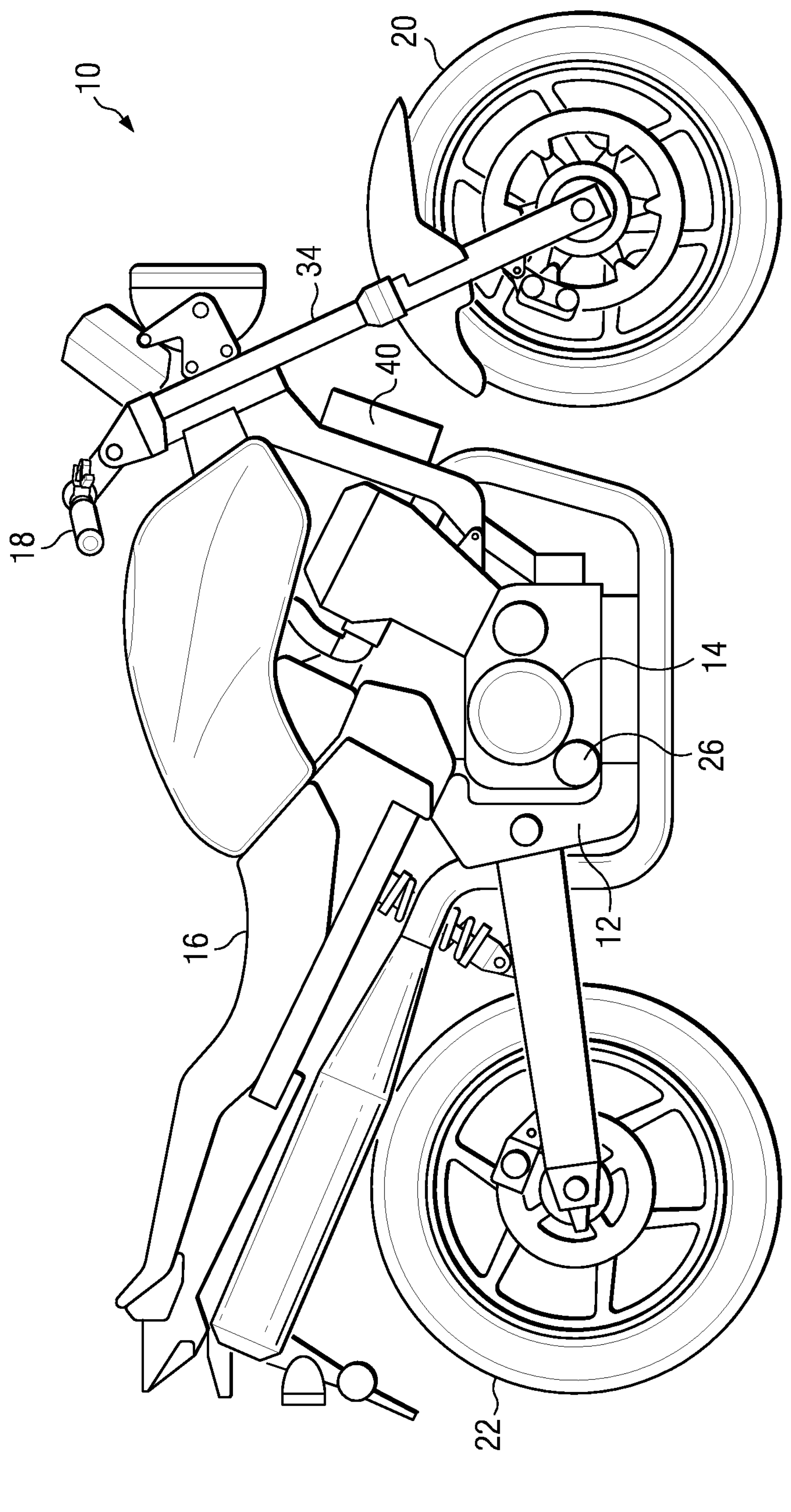
FIG. 1 is a side elevational view generally depicting a motorcycle in accordance with one embodiment.
Figure 2:
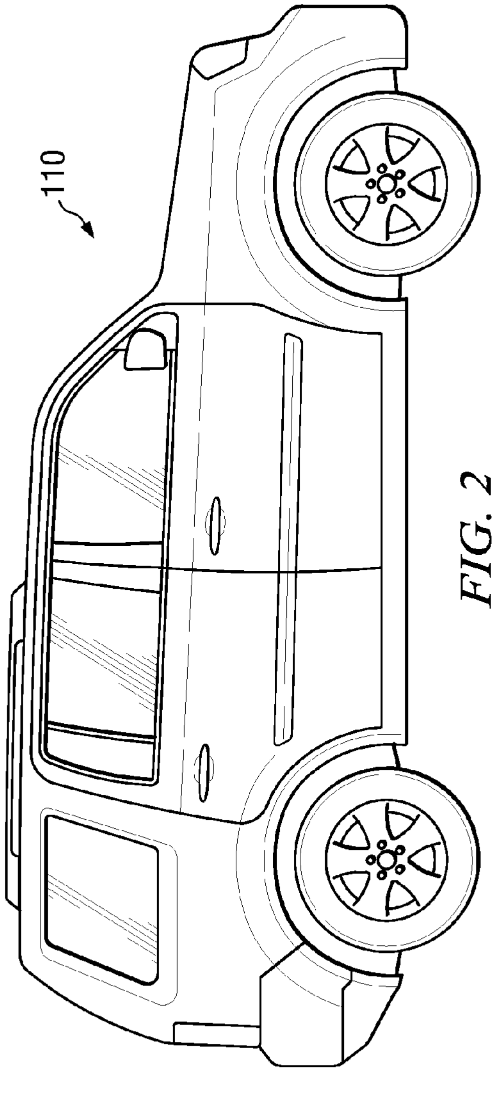
FIG. 2 is a side elevational view generally depicting a sport utility vehicle in accordance with another embodiment.

An example of a motorcycle 10 in accordance with one embodiment is depicted in FIG. 1, and an example of a sport utility vehicle 110 in accordance with another embodiment is depicted in FIG. 2. The engine of the power equipment apparatus can comprise an internal combustion engine, a turbine-type engine, or any of a variety of other suitable type of engine. The engine can be configured to consume gasoline, diesel fuel, biodiesel, propane, natural gas, ethanol, hydrogen, and/or any of a variety of other suitable fuels or combination thereof.

The motorcycle 10 is shown in FIG. 1 to include an engine 14. The engine 14 can comprise an internal combustion engine which is configured to consume gasoline, for example. The engine 14 can be attached to a frame 12 of the motorcycle 10 and can be configured to generate mechanical power for transmission to one or both of a front wheel 20 and a rear wheel 22 of the motorcycle 10. The front wheel 20 can be steered through actuation of handlebars 18 by an operator of the motorcycle 10 whom is seated upon a seat 16 attached to the frame 12 of the motorcycle 10.

Figure 3:
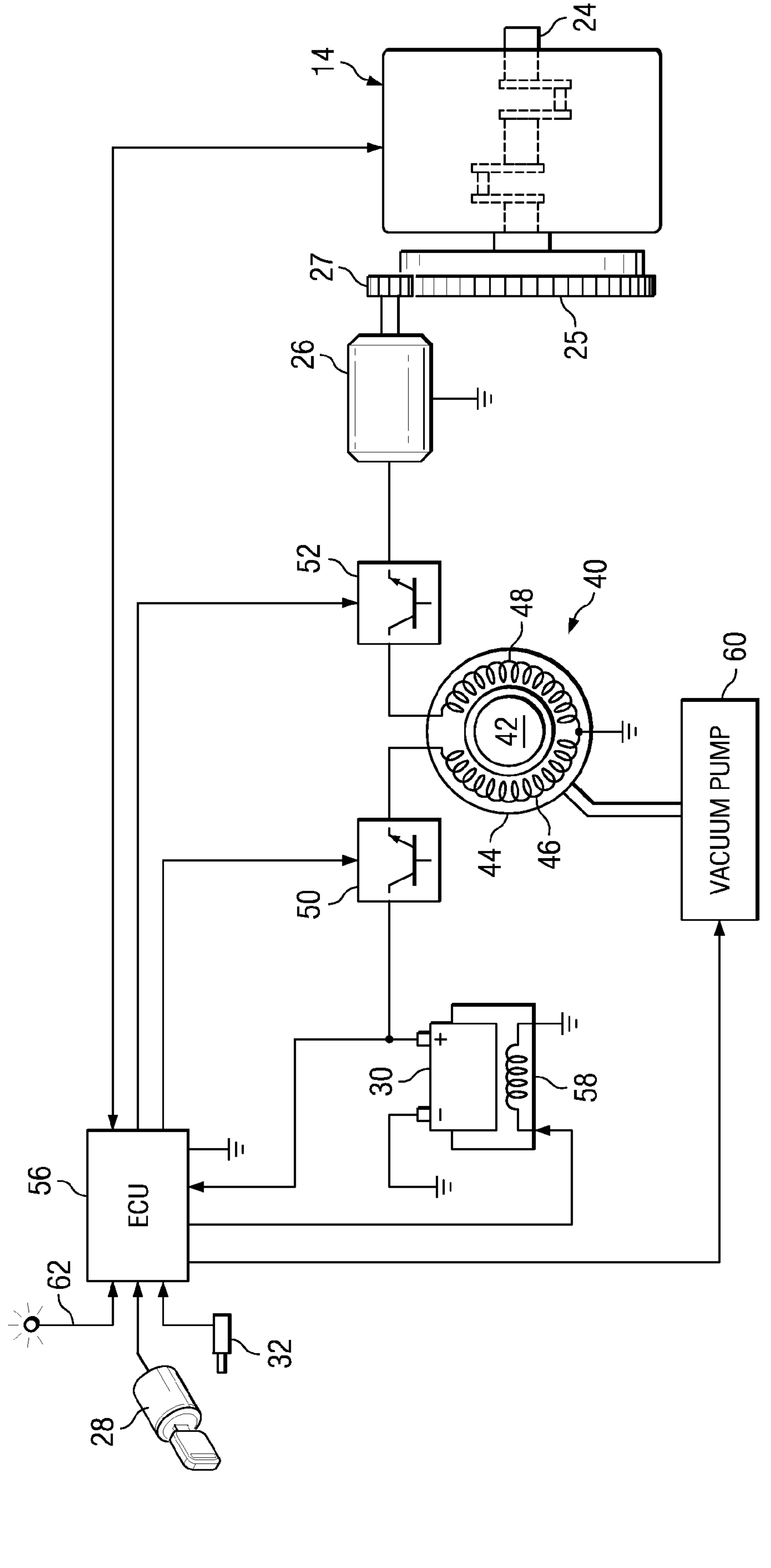
FIG. 3 is a schematic diagram generally depicting certain elements of the motorcycle of FIG. 1.

The motorcycle 10 also includes an electric starter motor 26 as generally shown in FIG. 1, and as shown schematically in association with the engine 14 in FIG. 3. The electric starter motor 26 can be operatively coupled with a crankshaft 24 of the engine 14 and can, in response to its receipt of electrical power, facilitate cranking of the engine 14. In particular, with reference to the embodiment of FIG. 3, a gear 27 can be splined or otherwise coupled with a rotor of the electric starter motor 26 and can interface a toothed flywheel 25 which is coupled with the crankshaft 24 of the engine 14. When electrical power is applied to the electric starter motor 26, the electric starter motor 26 can cause the gear 27, and thus the crankshaft 24, to rotate. It will be appreciated that rotation of the crankshaft 24, in conjunction with other activities (e.g., injection of air and fuel, and creation of spark), can facilitate starting of the engine 14. Significant amounts of electrical power might be required of the electric starter motor 26 to facilitate cranking of the engine 14, particularly when cranking the engine at low ambient temperatures (e.g., during freezing or other winter weather conditions).

Figure 4:
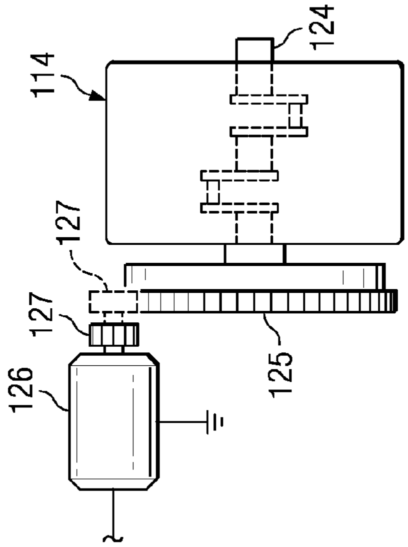
FIG. 4 is a schematic diagram depicting a starter motor and an engine in accordance with another embodiment.

In the embodiment of FIG. 3, the gear 27 and the electric starter motor 26 can remain engaged with the toothed flywheel 25 of the engine 14 at all times (i.e., both during cranking and normal operation of the engine 14). As will be discussed below, in this configuration, it will be appreciated that, the electric starter motor 26 can serve as a generator or alternator during normal operation of the engine. In an alternative embodiment, an electric starter motor can be configured to selectively disengage from an engine's crankshaft when the electric starter motor is not cranking the engine. For example, as shown in FIG. 4, an engine 114 is shown to comprise a toothed flywheel 125 which is coupled with a crankshaft 124 of the engine 114. An electric starter motor 126 is shown to have a rotor which is coupled with a gear 127. The gear 127 is shown to be movable between at least two positions (one shown in solid lines, and the other shown in dashed lines) to selectively disengage and engage the toothed flywheel 125 of the engine 114. Movement of the gear 127 between the two positions can be accomplished through use of a variety of suitable components including, for example, a solenoid and/or mechanical biasing. In one embodiment, the gear 127 can be configured to remain in the engaged position (shown in dashed lines in FIG. 4) only during cranking of the engine 114 by the starter motor 126, but to otherwise return to the disengaged position (shown in solid lines in FIG. 4). However, in an alternative embodiment, the gear 127 can be configured to remain in the engaged position during certain or all periods of normal operation of the engine. In addition to the configurations depicted and described above in connection with the examples of FIGS. 3 and 4, it will be appreciated that a starter motor can be coupled with a crankshaft of an engine in any of a variety of suitable alternative configurations.

A power equipment apparatus can include a battery which is configured to store energy for use to effectuate operation of a starter motor and resultant cranking and starting of an associated engine. In one embodiment, the battery can have a nominal voltage of about 12 V.D.C., as is typical of many conventional automobile batteries. By providing a battery having a nominal voltage of about 12 V.D.C., it will be appreciated that the battery can often readily interface other existing vehicular electrical systems, as many such systems are designed to operate at this voltage. However, it will be appreciated that a battery can have any of a variety of other suitable voltages such as, for example, 6 V.D.C. and/or 24 V.D.C., and/or that a vehicle can comprise more than one battery which can be connected in series and/or parallel.

In one embodiment, a battery can comprise a lead-acid type battery. However, in accordance with one embodiment, the battery might not comprise a lead-acid battery. For example, in one particular embodiment, the battery can comprise a lithium-ion battery (such as, for example, a lithium-ion thin film battery). In other embodiments, the battery can comprise a nickel-cadmium battery, a nickel metal hydride battery, or any of a variety of other suitable types of battery. In one embodiment, the battery can be relatively compact and lightweight and, as described further below, need not be capable of producing as much instantaneous power (typically identified in terms of "cold-cranking amps") as would be possible from a conventional lead-acid type battery.

In order to start the engine 14, an operator of the motorcycle 10 can actuate a starter switch 28 as shown in FIG. 3. The starter switch 28 can be configured for selective actuation by the operator and can comprise a key switch or a pushbutton, for example. In one embodiment, the starter switch 28 can be attached to the handlebars 18 of the motorcycle 10, but can alternatively be attached or positioned elsewhere upon the motorcycle 10. In accordance with one embodiment, actuation of the starter switch 28 can result in generation of an engine start signal which can be transmitted over wires, wirelessly, optically, or otherwise to a controller 56, such as an engine control unit ("ECU"), present upon the vehicle. In another embodiment, a starter switch can comprise a relay or other electronic circuit which is configured for actuation upon receipt of a remote start signal from an operator (e.g., from a key fob), and which is configured to generate an engine start signal. In response to receipt of the engine start signal, either from the starter switch 28 or from a remote start circuit (e.g., via an antenna 62 as described below), the controller 56 can effect a series of steps to facilitate starting of the engine 14, as described in further detail below.

In addition to being coupled with the starter switch 28, the controller 56 can also be coupled (via wires, wirelessly, optically, or otherwise) to other features or components present upon the power equipment apparatus. As illustrated in FIG. 3, the features or components can include an occupancy switch 32, an antenna 62, a heater module 58, and a vacuum pump 60. An occupancy switch can be configured to detect when an operator of the power equipment apparatus is preparing to operate the power equipment apparatus. For example, in the case of the motorcycle 10, the occupancy switch 32 can comprise a switch which is associated with the seat 16 of the motorcycle 10 and which generates an occupancy signal when an operator of the motorcycle 10 sits upon the seat 16. In another example, in the case of the sport utility vehicle 110 of FIG. 2, an occupancy switch can comprise a driver's door switch which can generate an occupancy signal when an operator of the sport utility vehicle 110 opens the driver's door of the sport utility vehicle 110. The antenna 62 can be configured to detect the proximity of an operator's key fob and/or to detect a remote start signal such as may be generated by an operator's key fob.

The heater module 58 can be associated with the battery 30 and can be configured to warm or pre-heat the battery 30, such as during cold weather conditions, in response to a preheat signal from the controller 56. In one embodiment, the heater module 58 can comprise heating coils which receive power from the battery 30 as directed by the controller 56. The vacuum pump 60 can be coupled with a flywheel assembly 40 and can be configured, as when directed by the controller 56, to create a vacuum with a housing of the flywheel assembly 40 in response to a vacuum signal from the controller 56, as described in further detail below.

The controller 56 can also be coupled with the engine 14, as generally depicted in FIG. 3, to facilitate passage of control signals from the controller 56 to the engine 14, and to facilitate receipt of monitoring signals from the engine 14 by the controller 56. The control signals can include, for example, fuel injector control signals. The monitoring signals can include, for example, coolant and/or oil temperature monitoring signals.

The controller 56 can also be coupled with each of the battery 30 and the flywheel assembly 40 and can be configured to monitor the state of charge of each of these devices. For example, the controller 56 can monitor the voltage of the battery 30, and perhaps also the current being drawn from the battery 30, to assess the state of charge of the battery 30. As another example, the controller 56 can monitor the rotational speed of the rotor 42 of the flywheel assembly 40 in order that the controller 56 can approximate the amount of energy stored in the flywheel assembly 40 at any given time.

The controller 56 is also shown in FIG. 3 to be coupled with power regulators 50 and 52 and can be configured to generate and transmit respective control signals to each of the power regulators 50 and 52. The power regulator 50 is shown to be coupled with each of the battery 30 and a low voltage coil 46 of a stator 44 of the flywheel assembly 40. The power regulator 50 can accordingly be configured to regulate power transfer between the battery 30 and the low voltage coil 46 in response to a control signal from the controller 56. The power regulator 52 is shown to be coupled with each of a high voltage coil 48 of the stator 44 and the electric starter motor 26. The power regulator 52 can accordingly be configured to regulate power transfer between the high voltage coil 48 and the electric starter motor 26 in response to a control signal from the controller 56. In one embodiment, each of the power regulators 50 and 52 comprises one or more source controlled rectifiers, insulated gate bipolar transistors, or other power electronic devices which is/are capable of being switched at high speeds (e.g., through pulse width modulation) or otherwise controlled by control signals from the controller 56 to selectively and controllably vary the amount of power conveyed by the respective power regulator 50 or 52.

The flywheel assembly 40 is shown in FIG. 3 to comprise the rotor 42 and the stator 44 and can be configured to store energy. The rotor 42 can rotate with respect to the stator 44 and can electromagnetically interact with the stator 44 in a manner typical of a conventional brushless DC motor, AC induction motor, or switched reluctance motor, for example. However, it will be appreciated that a flywheel assembly can be provided in any of a variety of alternative arrangements.

The flywheel assembly 40 can be positioned at any of a variety of suitable locations upon the motorcycle 10. For example, in one embodiment as shown generally in FIG. 1, the flywheel assembly 40 can be attached to the frame 12 of the motorcycle 10 at a position adjacent to a front fork 34 of the motorcycle 10. In another embodiment, a flywheel assembly can be positioned beneath a seat of a motorcycle. In one embodiment, positioning of the flywheel assembly upon a vehicle, such as a motorcycle, can be selected based upon optimization of vehicular space, cost, and weight considerations. However, in another embodiment, as a flywheel assembly can in some embodiments exhibit significant gyroscopic effects, one can select a position and configuration for the flywheel assembly such that its gyroscopic effects do not adversely affect, or perhaps even positively affect, handling and other performance characteristics of the vehicle or other power equipment apparatus (see, e.g., U.S. patent application Ser. No. 12/984,167, filed Jan. 4, 2011 and entitled "Flywheel Assemblies and Vehicles Including Same," the entire disclosure of which is hereby incorporated herein by reference).

In the example of FIG. 3, the electric starter motor 26 has a rated voltage, the battery 30 has a nominal voltage, and the rated voltage can be significantly different than the nominal voltage. For example, in one embodiment, the rated voltage of the electric starter motor 26 is about 300 V.D.C., and the nominal voltage of the battery 30 is about 12 V.D.C. In this configuration, due to this differential in voltages, all power transferred between the battery 30 and the electric starter motor 26 can pass through the flywheel assembly 40. Thus, in addition to serving as an energy storage device, the flywheel assembly 40 can also effectively serve as a high-powered DC to DC converter. It will be appreciated that, by providing an electric starter motor (e.g., 26) to have a rated voltage of 300 V.D.C. as opposed to a much lower voltage (e.g., 12 V.D.C., which can be typical of most or all of the other electrical components of an associated power equipment apparatus), resistance losses within the electric starter motor can be dramatically reduced, the physical size and cost of the electric starter motor can be reduced (or the power increased for a given physical size and cost), and smaller, lighter weight, and less expensive wiring devices can be implemented for association with the electric starter motor.

By implementation of the flywheel assembly 40 in this arrangement, it will be appreciated that the battery 30 can have a peak power producing capacity which is less than the power required of the electric starter motor 26 to rotate the crankshaft 24 (at an ambient temperature that falls within a range normally encountered by the engine 14). In other words, the battery 30 need not be capable of itself providing ample instantaneous power to facilitate cranking of the engine 14, but rather can provide that same amount of power over an extended period of time for storage in the flywheel assembly 40. The flywheel assembly 40 can then provide this power to the electric starter motor 26 over a relatively short period of time to facilitate cranking of the engine 14. In one embodiment, in such a configuration, multiple flywheel assemblies (e.g., each like flywheel assembly 40), can be electrically connected in parallel such as to provide increased power capacity (for engine starting) and/or for redundancy purposes (in the event of failure of one of the flywheel assemblies).

By sending suitable control signals to the power regulator 50, it will be appreciated that the controller 56 can vary the rate of power transfer from the battery 30 to the flywheel assembly 40, and can accordingly vary the rate at which the rotor 42 of the flywheel assembly 40 is accelerated, and the resultant rate at which the flywheel assembly 40 is charged with power. In one embodiment, the controller 56 can be configured to facilitate variation of the rate of power transfer between the battery 30 and the flywheel assembly 40 in response to its detection of at least one of ambient temperature (e.g., as can be determined by engine oil or coolant temperature) and charge of the battery 30. For example, at low temperatures or low states of charge of the battery 30, the controller 56 can cause acceleration of the rotor 42, and thus charging of the flywheel assembly 40, at a prolonged rate as compared with that which may be achievable at higher temperatures and/or states of charge of the battery 30. In this manner, the controller 56 can prevent draining of excessive current from the battery 30, and resultant damage to the battery 30.

It will also be appreciated that, by sending suitable control signals to the power regulator 52, the controller 56 can vary the rate of power transfer between the flywheel assembly 40 and the electric starter motor 26. By varying the amount of power provided to the electric starter motor 26, the controller 56 can adjust the speed and/or torque at which the electric starter motor 26 cranks the engine 14. Such adjustment can enable the controller 56 to avoid having the flywheel assembly 40 deliver more power to the electric starter motor 26 than is required of the electric starter motor 26 to crank the engine 14, and thus avoids wasting power. Also, certain other benefits, such as potentially in the area of emissions reduction, can be achieved by facilitating adjustability of engine cranking speed.

Also, by sending suitable control signals to the power regulator 50, the controller 56 can vary the rate of power transfer from the flywheel assembly 40 to the battery 30, and can accordingly vary the rate at which the battery 30 is charged by the flywheel assembly 40. Also, by sending suitable control signals to the power regulator 52, the controller 56 can vary the rate of power transfer from the electric starter motor 26 to the flywheel assembly 40, and can accordingly vary the rate at which the rotor 42 of the flywheel assembly 40 is accelerated under power from the electric starter motor 26, and is thus charged.

Once the flywheel assembly "charges up" to a predetermined energy limit, and once an engine start signal has been generated (e.g., as a result of actuation of the starter switch 28 or a remote start signal from a key fob), the controller 56 can send a control signal to the power regulator 52 to facilitate release of the power from the flywheel assembly 40 to the electric starter motor 26, and thus to facilitate starting of the engine 14. During this release of power, the controller 56 can also send a control signal to the power regulator 50 to facilitate continued provision of power from the battery 30 into the flywheel assembly 40 (e.g., at a level consistent with that provided by the battery 30 to the flywheel assembly 40 during "charging" of the flywheel assembly 40 prior to the cranking event). The predetermined energy limit of the flywheel assembly 40 can vary depending upon temperature and can range, for example, between 5 kJ and 20 kJ. At high temperatures, the predetermined energy limit may be lower than at low temperatures, and thus the charging time for the flywheel assembly may be reduced to improve customer convenience.

In one embodiment, since it takes time (e.g., 30-60 seconds) to facilitate charging of the flywheel assembly 40 from the battery 30 (e.g., at a current of about 60-80 A), a power equipment apparatus might be configured to begin this charging process before an operator actuates the starter switch or otherwise generates an engine start signal. For example, the controller 56 can initiate this charging process upon its receipt of a charge initiation signal. The charge initiation signal can be generated by or in response to actuation of an occupancy switch (e.g., 32 in FIG. 3) and/or detection (e.g., by an antenna 62 in FIG. 3) of at least one of a key fob sensor and/or a remote start signal. The controller 56 can accordingly be configured to initiate power transfer from the battery 30 to the flywheel assembly 40 in response to receipt by the controller 56 of such a charge initiation signal. Accordingly, in one embodiment, the controller 56 can cause the flywheel assembly 40 to begin charging as soon as an operator opens the driver's door. This way, there may only be a small delay between when an operator actuates the starter switch 28, and when the engine 14 is actually cranked. If, for example, the occupancy switch 32 provides the charge initiation signal, and the starter switch 28 is thereafter soon actuated, once the flywheel assembly 40 is adequately "charged" (i.e., the rotor 42 is adequately accelerated), the controller 56 can facilitate provision of the power stored within the flywheel assembly 40 to the electric starter motor 26 to facilitate starting of the engine 14. If, however, the occupancy switch 32 provides the charge initiation signal, and the starter switch 28 is not thereafter soon actuated, the controller 56 can then facilitate return to the battery 30 of the power stored within the flywheel assembly 40. Upon receipt of a charge initiation signal, the controller 56 can also in certain circumstances generate the pre-heat signal and/or the vacuum signal such as, for example, during low temperature conditions and/or during lack of sufficient vacuum within the flywheel assembly 40, respectively.

Accordingly, it will be appreciated that the flywheel assembly 40 of FIG. 3 can be configured to selectively receive power from the battery 30. The flywheel assembly 40 can store this power, and can then selectively dispense the power to the electric starter motor 26 to facilitate starting of the engine 14, or back to the battery 30 to facilitate recharging of the battery 30. As indicated above, in one embodiment, the battery 30 can continue providing power to the flywheel assembly 40 even during such time when the flywheel assembly 40 provides power to the electric starter motor 26 to facilitate cranking of the engine 14. If the electric starter motor 26 remains engaged with the crankshaft 24 during operation of the engine (e.g., as in FIG. 3), then the flywheel assembly 40 can be configured to selectively receive and store power from the electric starter motor 26 during operation of the engine 14. The flywheel assembly 40 can then selectively dispense the power received from the electric starter motor 26 to the battery 30 (i.e., to charge the battery) and/or the electric starter motor 26 (e.g., for restarting the engine 14). It will be appreciated that, in this configuration, the electric starter motor 26 and the flywheel assembly 40 can together provide a suitable charging system for the battery 30 such that the power equipment apparatus need not incorporate any separate alternator or generator as might otherwise be provided to maintain battery charge during operation of the power equipment apparatus.

Creation of a sufficient vacuum within a housing of the flywheel assembly 40 can facilitate improved efficiency and reduced friction losses during high speed rotation of the rotor 42 of the flywheel assembly 40. In one embodiment, the vacuum pump 60 can comprise a turbo-vacuum pump, though it will be appreciated that the vacuum pump 60 can be provided in any of a variety of suitable configurations. Once the vacuum pump 60 creates a vacuum within the flywheel assembly 40, the vacuum may be maintained for an extended period of time even though the vacuum pump 60 is no longer running depending, for example, upon the quality of seal present within the flywheel assembly 40. It will be appreciated that the controller 56 can be configured to selectively operate the vacuum pump 60 during operation of the engine 14 in order that the battery 30 can be recharged after operating the vacuum pump 60 and prior to stopping operation of the engine 14. The controller 56 can monitor the state of vacuum within the flywheel assembly 40 and, if the state of vacuum is insufficient, the controller 56 can cause the vacuum pump 60 to operate by withdrawing power from the battery 30 to create a sufficient vacuum within the flywheel assembly 40.

By providing a power equipment apparatus with a flywheel assembly such as described above, it will be appreciated that the power equipment apparatus can be provided with a smaller and lighter battery than would otherwise be required, as the battery need not by itself produce the large amount of power as required in real time by the electric starter motor during cranking of the engine. In fact, in accordance with one embodiment, battery weight could be reduced by up to 30%. A reduction in battery size and weight can result in improved performance and efficiency of an associated power equipment apparatus. In addition, this arrangement can improve cranking success, particularly at cold temperatures, as it can help to ensure the presence of a reliable and adequate power reservoir (i.e., within the flywheel assembly) prior to initiating cranking of the engine. Also, as the battery is never required to provide the full amount of power in real time as required by the electric starter motor, it will be appreciated that the useful life of the battery can be significant, perhaps as long as 10-12 years, thus requiring infrequent replacement of the battery.

When a battery has a low state of charge, the battery can still charge a flywheel assembly, albeit perhaps over a more extended period of time (e.g., exceeding 1-2 minutes). This would potentially enable the power equipment apparatus to be started in particularly cold situations in which conventional vehicles would be difficult or impossible to start from battery power alone. In this situation, if an operator uses a remote start function, the flywheel assembly can charge for 1-2 minutes from the battery before providing power to the electric starter motor, and before the operator even approaches the power equipment apparatus. In this situation, the operator is only minimally inconvenienced, the electric starter motor receives the power necessary to start the engine, and the battery is not exposed to a high current event, thus maximizing battery longevity.

It will also be appreciated that a vehicle in accordance with one embodiment can have improved fuel efficiency as compared to conventional vehicles. For example, in the embodiment of FIG. 3 in which the electric starter motor 26 remains engaged with the crankshaft 24 during operation of the engine 14, the crankshaft 24 can be configured to stop rotating each time the vehicle comes to a stop (e.g., during stop and go traffic). Before the crankshaft stops rotating, however, the controller 56 can facilitate passage of significant power from the electric starter motor 26 to the flywheel assembly 40, either during an extended low-power transfer, or during a short high-power transfer. When the vehicle is instructed by an operator to move again (e.g., when a traffic light turns green), the controller 56 can facilitate passage of the power from within the flywheel assembly 40 to the electric starter motor 26 to effect re-starting of the engine 14. In such an arrangement, the engine 14 can stop running when the associated vehicle is motionless, and restarting of the engine 14 can be achieved through use of energy stored in the flywheel assembly 40 during previous operation of the engine 14, thus saving fuel and enhancing efficiency of the vehicle, while avoiding any need for a large battery or imposition of excessive strain upon the battery.

Figure 5:
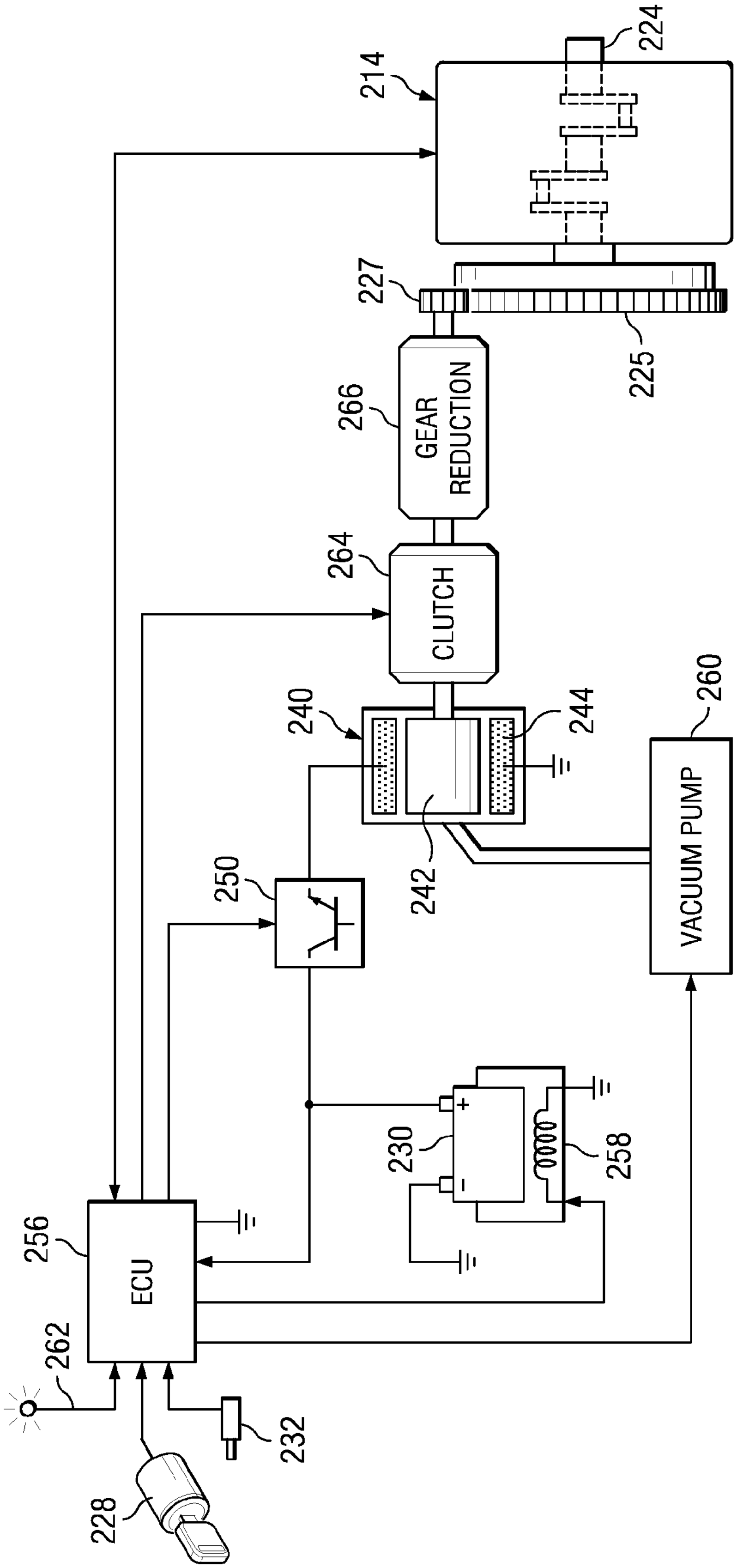
FIG. 5 is a schematic diagram generally depicting certain elements of a power equipment apparatus in accordance with another embodiment.

FIG. 5 depicts a power equipment apparatus having a flywheel assembly 240 in accordance with another embodiment. In particular, the power equipment apparatus in FIG. 5 can include a controller 256 which is coupled (via wires, wirelessly, optically, or otherwise) with a starter switch 228, a battery 230, an occupancy switch 232, an antenna 262, a heater module 258, a vacuum pump 260, an engine 214 and a power regulator 250, all of which components can operate and be configured generally as described above with respect to the embodiment of FIG. 3, but with certain differences as described below. For example, unlike the flywheel assembly 40 of FIG. 3, the flywheel assembly 240 of FIG. 5 includes a rotor 242 and a stator 244, and the rotor 242 is shown to be rotationally coupled with a crankshaft 224 of the engine 214. In particular, a clutch 264 and a gear reduction 266 are shown to rotationally couple the rotor 242 with the crankshaft 224.

The clutch 264 can be coupled with the controller 256 and can configured to selectively decouple the rotor 242 from the crankshaft 224 in response to a control signal from the controller 256. In this configuration, when the engine 214 is not operating, the clutch 264 is disengaged, and it becomes desirable to start the engine 214, the controller can facilitate provision of power from the battery 230, through the power regulator 250, and to the flywheel assembly 240 to facilitate acceleration of the rotor 242 and resultant charging of the flywheel assembly 240. The controller 256 can then engage the clutch 264 to facilitate coupling of the rotor 242 to the crankshaft 224 (e.g., through gear reduction 266, gear 227, and flywheel 225), and resultant cranking of the engine 214. During operation of the engine 214, with the clutch 264 engaged, power can be generated by the flywheel assembly 240 and provided to the battery 230 through the power regulator 250 to facilitate charging of the battery 230. It will be appreciated that, in one embodiment, the battery 230 can continue providing power to the flywheel assembly 240 even during the cranking of the engine 214 by the flywheel assembly 240.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A power equipment apparatus comprising:

an engine comprising a crankshaft;

an electric starter motor operatively coupled with the crankshaft;

a starter switch configured for selective actuation by an operator;

a battery;

a flywheel assembly comprising a rotor and a stator, wherein the stator comprises a low voltage coil and a high voltage coil;

a first power regulator coupled with each of the battery and the low voltage coil, wherein the first power regulator is configured to regulate power transfer between the battery and the low voltage coil in response to a first control signal;

a second power regulator coupled with each of the high voltage coil and the electric starter motor, wherein the second power regulator is configured to regulate power transfer between the high voltage coil and the electric starter motor in response to a second control signal; and a controller coupled with each of the battery, the starter switch, the first power regulator, and the second power regulator, wherein the controller is configured to generate the first control signal and the second control signal.

2. The power equipment apparatus of claim 1 wherein the battery does not comprise a lead-acid battery.

3. The power equipment apparatus of claim 2 wherein the battery comprises a lithium-ion battery.

4. The power equipment apparatus of claim 1 wherein the electric starter motor has a rated voltage, the battery has a nominal voltage, and the rated voltage is significantly different than the nominal voltage.

5. The power equipment apparatus of claim 4 wherein the rated voltage is about 300 V.D.C., and wherein the nominal voltage is about 12 V.D.C.

6. The power equipment apparatus of claim 1 wherein all power transferred between the battery and the electric starter motor passes through the flywheel assembly.

7. The power equipment apparatus of claim 1 wherein the controller is configured to facilitate variation of the rate of power transfer between the battery and the flywheel assembly in response to at least one of ambient temperature and charge of the battery.

8. The power equipment apparatus of claim 1 further comprising a heater module coupled with the controller, wherein the heater module is configured to preheat the battery in response to a preheat signal from the controller.

9. The power equipment apparatus of claim 1 further comprising a vacuum pump coupled with the controller, wherein the vacuum pump is configured to create vacuum within the flywheel assembly in response to a vacuum signal from the controller.

10. The power equipment apparatus of claim 1 wherein the controller is further coupled with and is configured to receive a charge initiation signal from at least one of a key fob sensor, an occupancy switch, and a remote start signal sensor, and wherein the controller is configured to initiate power transfer from the battery to the flywheel assembly in response to receipt by the controller of the charge initiation signal.

11. The power equipment apparatus of claim 1 wherein the flywheel assembly is configured to:

selectively receive power from the battery;

store the power received from the battery; and selectively dispense the power received from the battery to the electric starter motor to facilitate starting of the engine.

12. The power equipment apparatus of claim 1 wherein the flywheel assembly is configured to:

selectively receive power from the electric starter motor during operation of the engine;

store the power received from the electric starter motor; and selectively dispense the power received from the electric starter motor to at least one of the battery and the electric starter motor.

13. The power equipment apparatus of claim 1 wherein the battery has a peak power producing capacity which is less than the power required of the electric starter motor to rotate the crankshaft at an ambient temperature that falls within a range normally encountered by the engine.

14. The power equipment apparatus of claim 1 comprising a vehicle.

15. The power equipment apparatus of claim 14 comprising a saddle-type vehicle.

16. The power equipment apparatus of claim 15 comprising a motorcycle.

17. A saddle-type vehicle comprising:

a frame;

a seat attached to the frame and configured to support an operator;

an engine comprising a crankshaft and being attached to the frame;

an electric starter motor operatively coupled with the crankshaft;

a starter switch configured for selective actuation by an operator;

a battery;

a flywheel assembly comprising a rotor and a stator, wherein the stator comprises a low voltage coil and a high voltage coil;

a first power regulator coupled with each of the battery and the low voltage coil, wherein the first power regulator is configured to regulate power transfer between the battery and the low voltage coil in response to a first control signal;

a second power regulator coupled with each of the high voltage coil and the electric starter motor, wherein the second power regulator is configured to regulate power transfer between the high voltage coil and the electric starter motor in response to a second control signal; and a controller coupled with each of the battery, the starter switch, the first power regulator, and the second power regulator, wherein the controller is configured to generate the first control signal and the second control signal; wherein:

all power transferred between the battery and the electric starter motor passes through the flywheel assembly; and the flywheel assembly is configured to:

selectively receive power from the battery;

store the power received from the battery; and selectively dispense the power received from the battery to the electric starter motor to facilitate starting of the engine.

18. The saddle-type vehicle of claim 17 wherein the battery comprises a lithium-ion battery.

19. The saddle-type vehicle of claim 17 wherein the controller is configured to facilitate variation of the rate of power transfer between the battery and the flywheel assembly in response to at least one of ambient temperature and charge of the battery.

20. The saddle-type vehicle of claim 17 wherein the flywheel assembly is further configured to:

selectively receive power from the electric starter motor during operation of the engine;

store the power received from the electric starter motor; and selectively dispense the power received from the electric starter motor to at least one of the battery and the electric starter motor.

21. A power equipment apparatus comprising:

an engine comprising a crankshaft;

a starter switch configured for selective actuation by an operator;

a battery;

a flywheel assembly comprising a rotor and a stator, the rotor being rotationally coupled with the crankshaft;

a power regulator coupled with each of the battery and the stator, wherein the power regulator is configured to regulate power transfer between the battery and the stator in response to a control signal;

a controller coupled with each of the battery, the starter switch, and the power regulator, wherein the controller is configured to generate the control signal.

22. The power equipment apparatus of claim 21 further comprising a clutch, wherein the clutch rotationally couples the rotor with the crankshaft, and wherein the clutch is configured to selectively decouple the rotor from the crankshaft.

23. The power equipment apparatus of claim 21 further comprising a reduction gearbox rotationally coupling the rotor and the crankshaft.

* * * * *